United States Patent
Roberts et al.

(10) Patent No.: US 8,805,206 B2
(45) Date of Patent: Aug. 12, 2014

(54) SINGLE PIN COHERENT RECEIVER

(75) Inventors: Kim B. Roberts, Nepean (CA); Shahab Oveis Gharan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 481 days.

(21) Appl. No.: 12/893,294

(22) Filed: Sep. 29, 2010

(65) Prior Publication Data

US 2012/0076507 A1    Mar. 29, 2012

(51) Int. Cl.
*H04B 10/06* (2006.01)

(52) U.S. Cl.
USPC ........... 398/202; 398/203; 398/204; 398/205; 398/207; 398/212; 398/214

(58) Field of Classification Search
CPC ...... H04B 10/60; H04B 10/61; H04B 10/611; H04B 10/614; H04B 10/616; H04B 10/64
See application file for complete search history.

(56) References Cited

U.S. PATENT DOCUMENTS

| | | | |
|---|---|---|---|
| 7,555,227 B2 | 6/2009 | Bontu et al. | |
| 7,606,498 B1 | 10/2009 | Wu et al. | |
| 8,005,368 B2 | 8/2011 | Roberts et al. | |
| 2003/0123877 A1* | 7/2003 | Lo | 398/34 |
| 2004/0208643 A1* | 10/2004 | Roberts et al. | 398/186 |
| 2004/0264981 A1* | 12/2004 | Zhang et al. | 398/204 |
| 2005/0196176 A1* | 9/2005 | Sun et al. | 398/152 |
| 2007/0217791 A1* | 9/2007 | Price | 398/152 |
| 2009/0028268 A1* | 1/2009 | Locke | 375/295 |

* cited by examiner

*Primary Examiner* — Darren E Wolf
(74) *Attorney, Agent, or Firm* — Kent Daniels; Daniels IP Services Ltd.

(57) ABSTRACT

In a coherent optical receiver of an optical communications system, methods and systems for receiving a data signal x(t) modulated on an optical signal. A linearly polarized LO light is generated, which has a frequency of $f_1=f_0\pm\Delta f$, where $f_0$ is a frequency of a narrowband carrier of the optical signal, and $\Delta f$ corresponds with a band-width $f_B$ of the data signal x(t). The LO light and a received light of the optical signal are heterodyned on a photodetector. An analog signal generated by the photodetector is low-pass filtered to generate a filtered signal, using a filter characteristic having a sharp cut-off at a frequency of $\Delta f+nf_B$, where n is an integer multiple. An analog-to digital (A/D) converter samples the filtered signal at a sample rate of $2(\Delta f+nf_B)$ to generate a corresponding multi-bit digital sample stream. The multi-bit digital sample stream is digitally processed to recover respective In-Phase and Quadrature components of the received light of the optical signal.

13 Claims, 6 Drawing Sheets

SINGLE PIN COHERENT RECEIVER

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to a coherent optical receiver having a single PIN detector path for each polarization.

BACKGROUND

In optical communication systems that employ coherent optical receivers, the modulated optical signal received at the coherent receiver is mixed with a narrow-line-width local oscillator (LO) signal, and the combined signal is made incident on one or more photodetectors. The frequency spectrum of the electrical current appearing at the photodetector output(s) is substantially proportional to the convolution of the received optical signal spectrum and the local oscillator (LO) spectrum, and contains a signal component lying at an intermediate frequency that contains data modulated onto the received signal. Consequently, this "data component" can be isolated and detected by electronically filtering and processing the photodetector output current.

Figure 1:
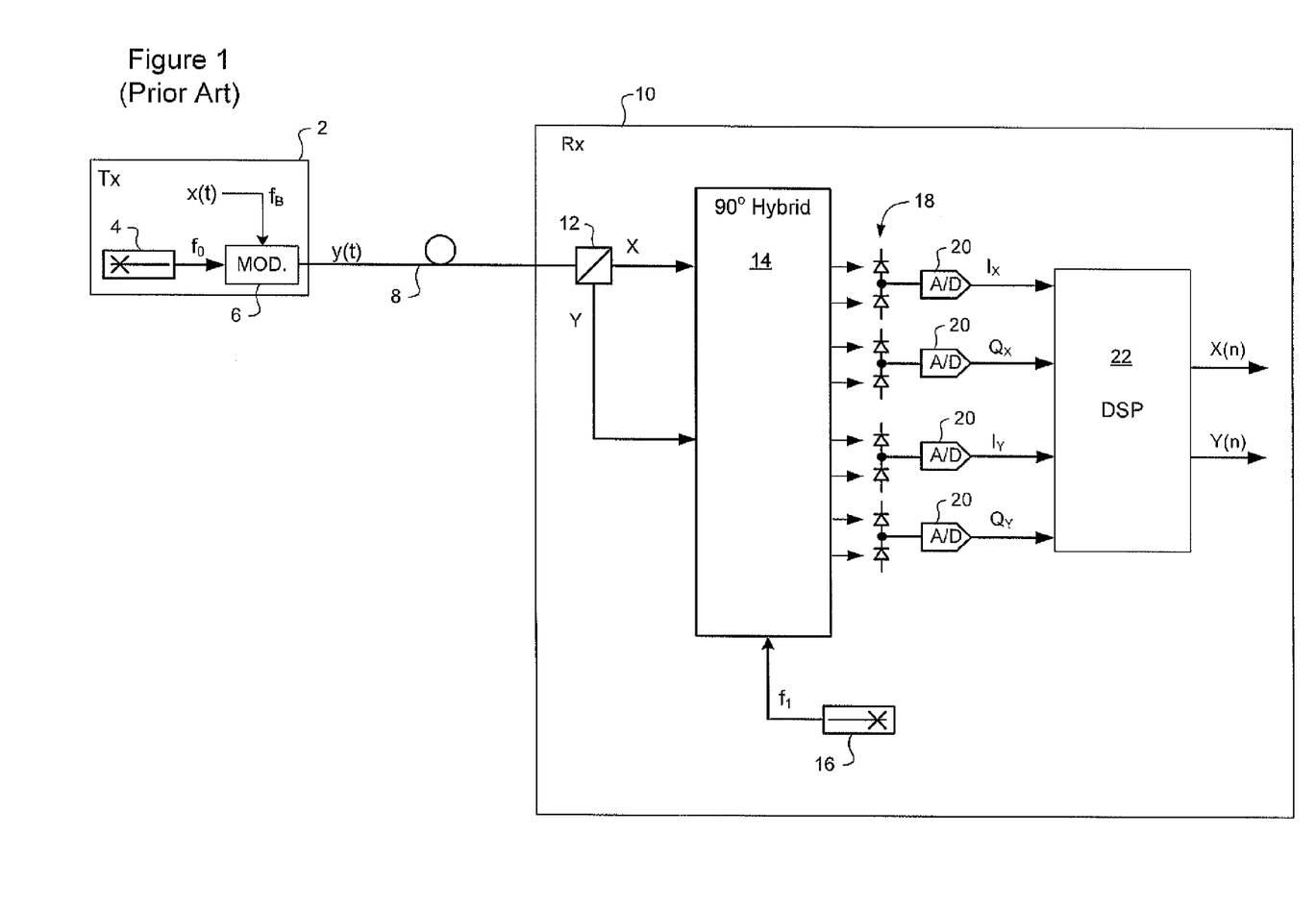
FIG. 1 is a block diagram schematically illustrating a coherent optical transmission system, known in the art.

FIG. 1 schematically illustrates an optical communications system which incorporates a representative coherent optical receiver known in the art, and, for example, from U.S. Pat. No. 7,606,498.

In the optical communications system of FIG. 1, the transmitter 2 comprises a Tx local oscillator laser 4, which generates a narrow-band optical carrier light having a center frequency of $f_0$. This optical carrier light is modulated by an optical modulator 6 in accordance with a drive signal S(t), which includes encoded data signal x(t) having a bandwidth of $f_B$ (where $f_0 \gg f_B$). The baseband data signal x(t) can be generally represented as $x(t)=x_I(t)+jx_Q(t)$, where $x_I(t)$ and $x_Q(t)$ respectively represent the In-Phase and Quadrature (or, equivalently, the Real (Re) and Imaginary (Im)) components of the baseband data signal x(t). As may be appreciated, the baseband data signal x(t) may be either real or complex. Where x(t) is a complex signal (such as, for example, a M-ary phase shift keying signal) the value of each encoded symbol is represented by either one or both of the amplitude and phase. In such cases, the optical modulator 6 is configured to modulate both amplitude and phase of the narrow-band optical carrier light in accordance with the data signal x(t) to generate the modulated optical signal y(t). Where x(t) is a real signal (such as, for example, a multi-level Amplitude Shift Keying (ASK) signal), the value of an encoded symbol is represented by the analog amplitude level, thus $x_Q(t)=0$. In such cases, the optical modulator 6 is configured to modulate the amplitude of the narrow-band optical carrier light in accordance with the data signal x(t) to generate the modulated optical signal y(t).

The modulated optical signal y(t) is transmitted through an optical fibre link 8 to the coherent optical receiver 10. Typically, the optical fibre link 8 will include multiple optical fibre spans cascaded in series with various optical equipment including, for example, optical amplifiers, Optical Add-Drop Multiplexers (OADMs) etc.

In the coherent optical receiver 10 of FIG. 1, the inbound optical signal y(t) received through the optical link 8 is split into orthogonal received polarizations X, Y by a Polarization Beam Splitter 12. The received X and Y polarizations are then supplied to a conventional 90° optical hybrid 14, and mixed with Local Oscillator (LO) light having a frequency of $f_1$ generated by an receiver LO laser 16 and the composite lights emerging from the optical hybrid 14 supplied to a respective photodetector 18, which generates a corresponding analog detector signal. Typically, each photodetector 18 is provided as a balanced pair of P-Intrinsic-N (PIN) diodes, and the analog current of the corresponding detector signal is proportional to the optical power of the incident composite light. Each of the analog detector signals output by the photodetectors 18 is sampled by a respective Analog-to-Digital (A/D) converter 20, to yield multi-bit digital I and Q raw sample streams for each of the received X and Y polarizations. In order to avoid aliasing errors, Nyquist sampling is typically used, in which the sample rate $f_S$ of the A/D converter 20 is about twice the band-width $f_B$ of the received optical signal. From the A/D converter 20 block, the I and Q raw sample streams of each received polarization are supplied to digital signal processor (DSP) 22 for data and carrier recovery using methods known in the art.

Figure 2A:
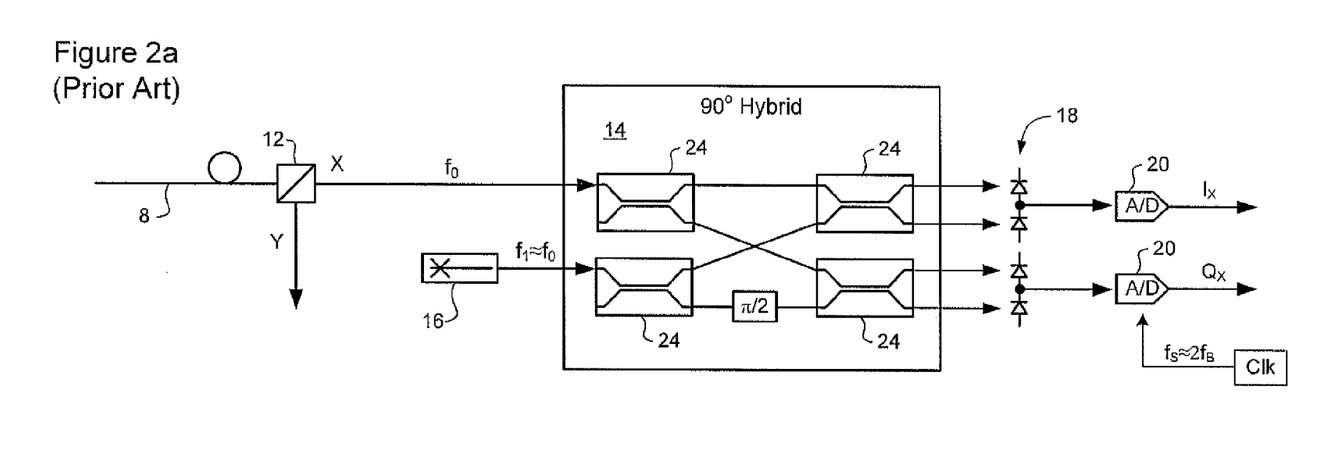
FIGS. 2a and 2b are block diagrams schematically illustrating operations of conventional coherent optical receivers known in the art.

FIG. 2a illustrates, in greater detail, the optical hybrid 14 for the X polarization. This arrangement is duplicated for the Y-polarization. As may be seen in FIG. 2a, for each polarization, the optical hybrid 14 implements a homodyne optical downconverter comprising a set of four balanced optical mixers 24, which are arranged such that the received polarization light is mixed with the Rx LO light and a 90° phase-shifted version of the Rx LO light, to generate the composite lights that are made incident of the photodetectors 18. By controlling the Rx LO 16 to output the Rx LO light frequency $f_1=f_0$, and further controlling the polarization angles of the received X polarization light and the Rx LO lights propagating through the optical mixers 24, the composite light output from the hybrid 14 will contain base-band beat products (centered at around 0 Hz) corresponding to the original drive signal x(t). In some cases, optical polarization controllers (not shown) are used to ensure the required alignment between the polarization angles of the X polarization light and the Rx LO lights. With this arrangement, driving the A/D converters 20 to sample the analog detector signals output by the photodetectors 18 at a sample rate $f_S \approx 2f_B$ yields In-Phase and Quadrature raw sample streams $I_X$, $Q_X$ from which the encoded data signal x(t) can be recovered using known digital signal processing techniques.

Figure 2B:
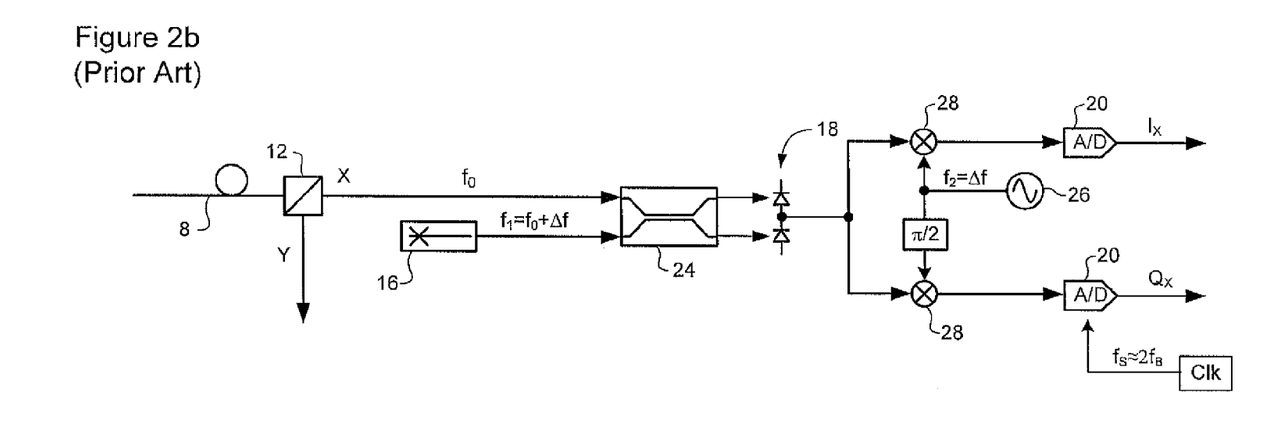

A limitation of the arrangement of FIG. 2a, is that the need for multiple optical mixers 24 along with a 90° phase shifter and one or more optical polarization controllers makes the 90° optical hybrid 14 very expensive. FIG. 2b illustrates an alternative arrangement which utilizes fewer high-cost optical components.

The receiver of FIG. 2b implements an optical heterodyne downconverter, which utilizes a single optical mixer 24 (and, possibly, a polarization controller to ensure alignment) which mixes the received X polarization light with the Rx LO light, to generate a composite light that is made incident on a single photodetector 18. By controlling the Rx LO 6 to output the Rx LO light with a frequency $f_1$ at a desired offset $\Delta f$ from the Tx optical carrier frequency $f_0$, the composite light output from the mixer 24 will contain Intermediate Frequency (IF) beat products (centered at around $\Delta f$) corresponding to the original drive signal x(t). The corresponding IF signal components in the analog detector signal output by the photodetector 18 can then be down-converted to In-phase and Quadrature baseband signals using an electronic oscillator 26 to generate an oscillator signal having a frequency $f_2$ and analog mixers 28 for mixing the analog detector signal with the oscillator signal and a 90° phase shifted version of the oscillator signal. As in the receiver of FIG. 2a, driving the A/D converters to sample the mixer output signals at a sample rate $f_S \approx 2f_B$ yields In-Phase and Quadrature raw sample streams $I_X$, $Q_X$ from which the encoded data signal x(t) can be recovered using known digital signal processing techniques.

A limitation of the arrangement of FIG. 2b is that generation of the baseband signals sampled by the A/D converters 20 involves a 2-stage down-conversion process. Both of these downconversion stages are subject to frequency errors and feedback loop delays. In order to obtain an acceptable Signal to Noise Ratio (SNR) in the raw sample streams $I_X$, $Q_X$ output from the A/D converters 20, the Rx LO must be controlled to maintain a desired frequency offset $\Delta f$ between the Rx LO light and the Tx optical carrier frequency $f_0$, and the electronic LO must be controlled to maintain an output frequency $f_2$ that closely matches the frequency offset $\Delta f$. This cannot be done in the presence of moderate to severe optical channel impairments, because these impairments must be compensated before a reasonably accurate estimate of the optical carrier frequency $f_0$, and thus the frequency offset $\Delta f$, can be obtained. However, this estimate of the frequency offset $\Delta f$ is needed to enable the A/D converters 20 to produce raw sample streams $I_X$, $Q_X$ with a high enough SNR that the impairments can be compensated. Accordingly, receivers implementing optical heterodyne down-conversion have not typically been implemented outside of laboratory conditions.

Techniques for carrier recovery that overcome limitations of the prior art remain highly desirable.

SUMMARY

There are disclosed methods and techniques for recovering data symbols in a coherent optical receiver having only a single data path for each received polarization.

Accordingly, an aspect of the present invention provides, in a coherent optical receiver of an optical communications system, methods and systems for receiving a data signal x(t) modulated on an optical signal. A linearly polarized LO light is generated, which has a frequency of $f1 = f_0 \pm \Delta f$, where $f_0$ is frequency of the narrowband carrier of the optical signal, and $\Delta f$ corresponds with the band-width $f_B$ of the data signal x(t). The LO light and the received light of the optical signal are heterodyned on a photodetector. An analog signal generated by the photodetector is low-pass filtered to generate a filtered signal, using a filter characteristic having a sharp cut-off at a frequency of $\Delta f + nf_B$, where n is an integer multiple. An analog-to digital (A/D) converter samples the filtered signal at a sample rate of $2(\Delta f + nf_B)$ to generate a corresponding multi-bit digital sample stream. The multi-bit digital sample stream is digitally processed to recover respective In-Phase and Quadrature components of the received light of the optical signal.

Techniques in accordance with the present invention is applicable to optical communications systems employing dual-polarization and single polarization optical signals

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION

In general, the optical transmitter 2 will transmit data signals on two orthogonal polarizations. Due to polarization impairments of the optical link 8, when the optical signal arrives at the receiver end of the link, these transmitted polarizations will typically be neither orthogonal nor aligned with the polarization beam splitter 12 of the receiver 10. However, for ease of understanding the present invention, a description will first be provided for a special case in which the transmitted polarization on which the data signal x(t) is modulated is aligned with the polarization beam splitter 12 of the receiver 10, so that the received X polarization light contains modulation products of the transmitted data signal x(t). A description will then be provided to address the more practical case where the transmitted polarizations are neither orthogonal nor aligned with the polarization beam splitter 12 of the receiver 10.

Figure 3A:
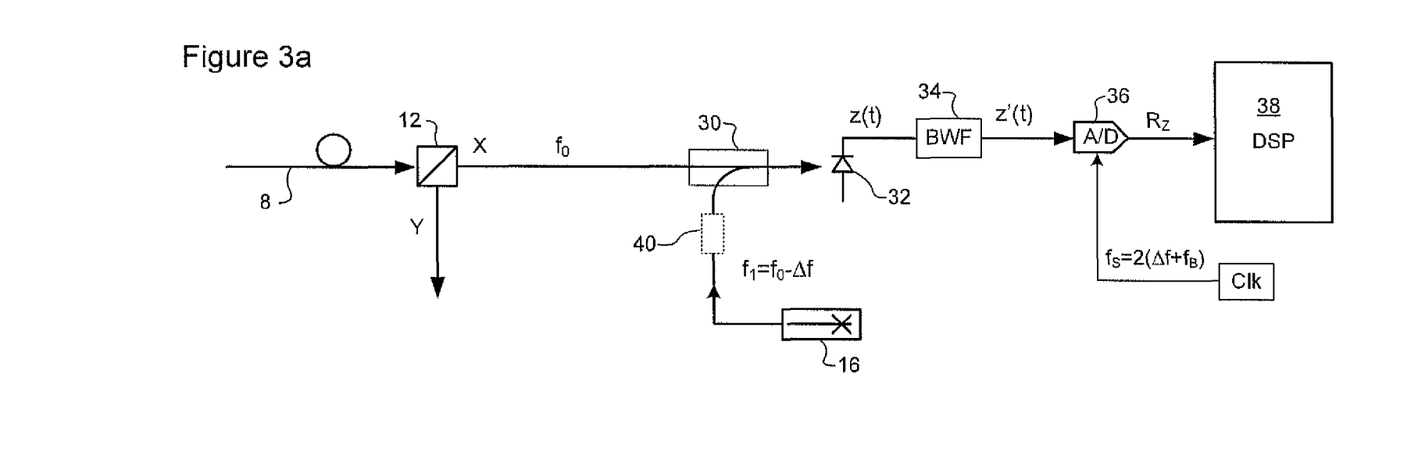
FIGS. 3a-3c are block diagrams schematically illustrating operations of a coherent optical receiver implementing methods in accordance with a representative embodiment of the present invention.
Figure 3B:
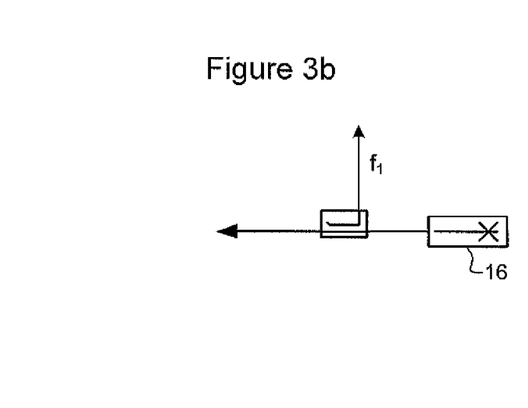

Referring to FIGS. 3a-b, there is shown a block diagram schematically illustrating a coherent optical receiver in accordance with a representative embodiment of the present invention. The receiver of FIG. 3 comprises an optical power combiner 30 for combining the received X polarisation light with Rx LO light from the Rx LO laser 16, a photodetector 32 comprising a single PIN diode for generating an analog signal z(t) proportional to the analog power of the combined light received from the power combiner 30; and an approximation to a brick-wall filter (BWF) 34 for low-pass filtering the analog signal z(t) output from the photodetector 32. The filtered analog signal z'(t) output from the BWF 34 is then sampled by an A/D converter 36 to generate a raw sample stream $R_Z$, which is supplied to a digital signal processor 38, for distortion compensation and data recovery.

Figure 3C:
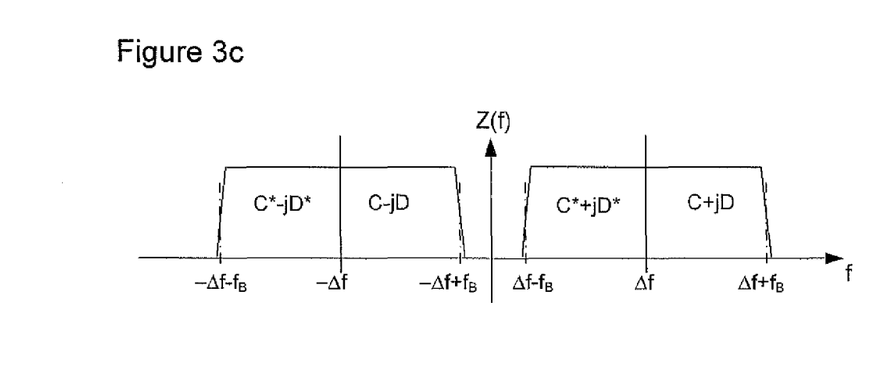

The Rx LO laser 16 is controlled to generate the Rx LO light with a frequency $f_1$, which has frequency difference $\Delta f = |f_0 - f_1|$ with the transmitter optical carrier signal, and a phase error or mismatch of $\phi(t)$ with the incoming optical signal y(t). In the embodiment of FIG. 3a-c, $f_1 < f_0$, thus $f_1 = f_0 - \Delta f$. However, this is not essential. In alternative embodiments, $f_1 = f_0 + \Delta f$. At least the phase mismatch is time-varying and unknown. However, $\Delta f \ll f_0$, $f_1$ and $\phi(t)$ varies slowly enough in time that it will not move the signal to another frequency.

Preferably, the frequency offset $\Delta f$ is at least equal to the band-width $f_B$ of the data signal x(t). As will be appreciated, this arrangement will cause the received X polarisation light and the Rx LO light to heterodyne at the photodetector 32 to yield mixing products corresponding to the data signal x(t) within a spectral band of $\Delta f \pm f_B$, as may be seen in FIG. 3c. In some embodiments, $\Delta f = f_B$. In other embodiments, $\Delta f = f_B + \delta f$, where $\delta f$ is a small frequency difference selected to prevent overlap (and thus interference) between the spectral bands. If desired, the frequency difference $\delta f$ can also be selected based on expected line width and frequency jitter of the Tx and Rx LO lasers, which improves receiver performance in the presence of frequency transients in the optical carrier and Rx LO light.

The BWF 34 is configured as an analog low-pass filter having a sharp cut-off. In the embodiment of FIG. 3a-c, the cut-off frequency of the BWF 34 is set equal to $\Delta f + f_B$ so that frequency components in the photodetector signal z(t) lying above the spectral range of the data signal x(t) are strongly attenuated.

In general, the A/D converter 36 is a high-speed A/D converter designed to sample the filtered photodetector signal z'(t) at a sample rate $f_S$, which is selected based on the encoding scheme of the data signal x(t) and the digital processing performed by the DSP 38. For example, in an embodiment in which the data signal x(t) is real (eg the encoding scheme utilizes a symbol constellation that lies on the real axis of the real/imaginary phase space), it can be shown that the data signal x(t) can be recovered using a sample rate of $f_S = 2\Delta f$. In embodiments in which the data signal x(t) is complex, it can be shown that the data signal x(t) can be recovered using a sample rate of $f_S = 2(\Delta f + f_B)$. An example of each of these scenarios will be described in further detail below. Preferably, the resolution of the A/D converter 36 is at least 5 bits. Higher resolution is beneficial in that it enables improved accuracy in subsequent processing by the DSP 38, but at a cost of increasing the complexity and cost of the A/D converter 36 itself, and an increase in the heat generated during operation.

In some embodiments, a polarization controller 40 (shown in dashed lines) may be used to ensure alignment between the polarization angle of the Rx LO light from the Rx LO laser 16 and the received X polarisation light from the polarization beam splitter 12.

In some embodiments, the Rx LO laser 16 may be purposed solely to generate the Rx LO light, as illustrated in FIG. 3a. In alternative embodiments, the Rx LO laser 16 may be used for other purposes (such as, for example, generating a narrow-band Tx carrier) and the Rx LO light obtained by tapping a portion of the optical power of the light output from the and the Rx LO laser 16, as may be seen in FIG. 3b.

The photodetector 32 is preferably selected to have a bandwidth that is at least equal to half the sample rate $f_S$ of the A/D converter 36.

As noted above, the data signal x(t) can be generally represented as $x(t) = x_I(t) + jx_Q(t)$, where $x_I(t)$ and $x_Q(t)$ respectively represent the In-Phase and Quadrature (or, equivalently, the Real (Re) and Imaginary (Im)) components of the data signal x(t). FIG. 3c schematically illustrates the spectrum of the filtered photodetector signal z'(t). As may be seen in FIG. 3c, the signal spectrum contains mixing products corresponding to the data signal x(t), where "C" and "D" respectively represent the frequency domain (e.g. Fourier Transform) spectra of $x_I(t)$ and $x_Q(t)$.

Figure 4A:
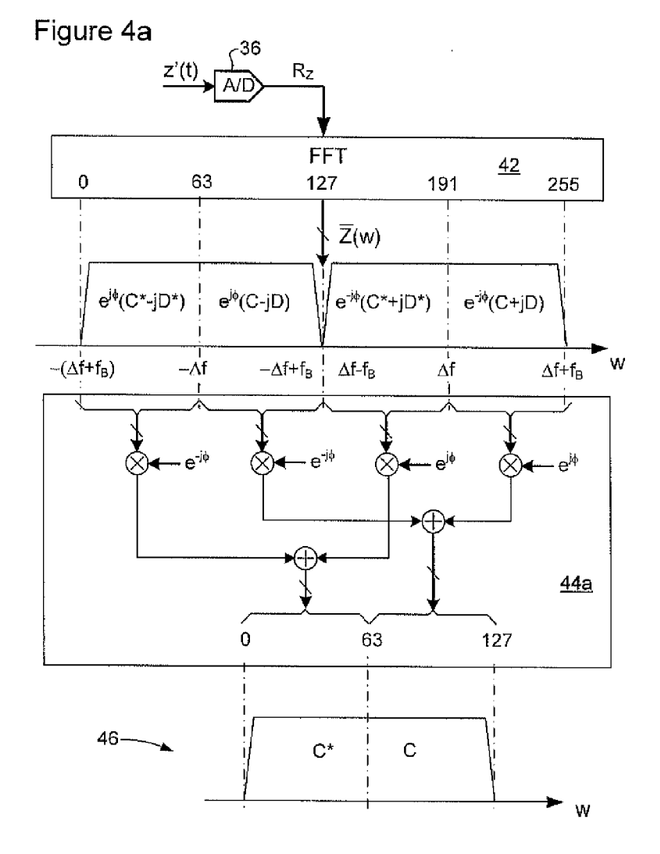
FIGS. 4a and 4b are block diagrams schematically illustrating operations of the DSP of FIG. 3a, in accordance with respective representative embodiments of the present invention.
Figure 4B:
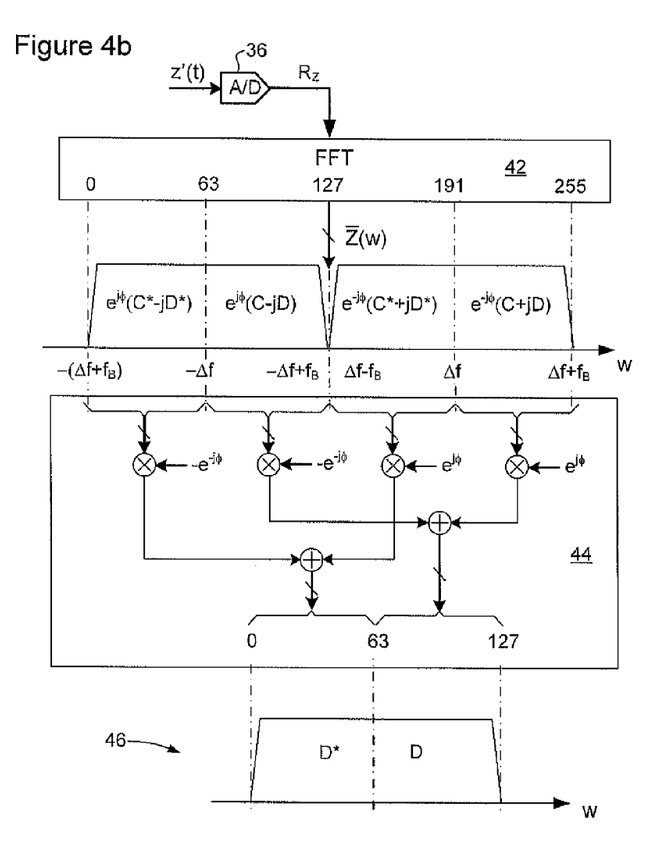

The DSP 38 is configured to process the raw sample stream $R_Z$ output from the A/D converter 36 to recover the In-Phase and Quadrature components $x_I(t)$ and $x_Q(t)$. As may be seen in FIGS. 4a and 4b, the raw sample stream $R_Z$ received from the A/D converter 36 is supplied to a Fast Fourier Transform (FFT) block 42, which computes the FFT of the filtered photodetector current z'(t) to yield an FFT vector $\overline{Z}(w)$ which closely models the signal spectrum Z(f) illustrated in FIG. 3c. In the FFT vector $\overline{Z}(w)$, the terms $e^{j\phi}$ and $e^{-j\phi}$ are due to the phase error $\phi$ between the inbound optical signal and the LO. In the embodiment of FIGS. 4a-b, the FFT vector has a width of 256 taps, but this us not essential. More or fewer taps may be used, if desired. As may be seen in FIG. 4a, a re-ordering and re-timing block 44a divides the FFT vector into sub-bands, which are then multiplied with $e^{j\phi}$ and $e^{-j\phi}$ to compensate the phase error $\phi$, and then summed in the mariner shown to cancel the quadrature component D (and its conjugate D*) and thereby generate an output vector 46a which contains only the in-phrase component C having a width of ½ that of the FFT vector $\overline{Z}(w)$. As may be seen in FIG. 4b, a corresponding re-ordering and re-timing block 44b divides the FFT vector into sub-bands, which are then multiplied with $e^{j\phi}$ and $-e^{-j\phi}$ to compensate the phase error $\phi$, and then summed in the manner shown to cancel the In-phase component C (and its conjugate C*) and thereby generate an output vector 46a which contains only the quadrature component D. An advantage of the arrangement of FIGS. 4a and 4b is that the In-phase and Quadrature components are recovered in the frequency domain by summation/subtraction of different frequency components followed by a reordering of the frequency content. Hence, no aliasing distortion is imposed on the output signal. Finally, fractional sampling to $2f_B$ samples/sec is easily applied in the frequency domain.

Once the In-Phase and Quadature components C and D have been computed, known methods can be used for dispersion compensation and carrier recovery. For example, the methods disclosed in U.S. Patent Application Publication No. 2009/0148164 can be used to derive multi-bit estimates of the symbols modulated onto each transmitted polarization. These methods will operate in the presence of the frequency offset $\Delta f$ and the phase error $\phi$. The methods disclosed in U.S. Pat. No. 7,606,498 can then be used to derive estimates for both the instantaneous frequency offset $\Delta f$ and the phase error $\phi$, and remove these effects from the multi-bit symbol estimates. Because the techniques of U.S. Patent Application Publication No. 2009/0148164 and U.S. Pat. No. 7,606,498 are highly tolerant of residual frequency offset $\Delta f$ and phase error $\phi$ in the calculated In-Phase and Quadrature components $x_I(t)$ and $x_Q(t)$, it is not necessary for the compensation parameters $e^{j\phi}$, $e^{-j\phi}$ and $-e^{-j\phi}$ in the re-ordering and re-timing blocks 44a and 44b to be updated in real-time to track short-period excursions in the frequency offset $\Delta f$ and phase error $\phi$. Consequently, satisfactory performance can be obtained by updating the values of $\Delta f$ and $\phi$ at regular intervals.

For example, the methods of U.S. Pat. No. 7,606,498 employ nominally regularly spaced SYNC bursts embedded within a stream of data symbols. Each SYNC burst 24 has a respective predetermined symbol (or, equivalently, bit) sequence on each transmitted polarization. These SYNC bursts are used for carrier recovery and to derive estimates for both the frequency offset $\Delta f$ and the phase error $\phi$, which are updated at the SYNC burst frequency. In the methods of the present invention, this update frequency can be used to update re-ordering and re-timing blocks 44a and 44b with satisfactory results.

Figure 5A:
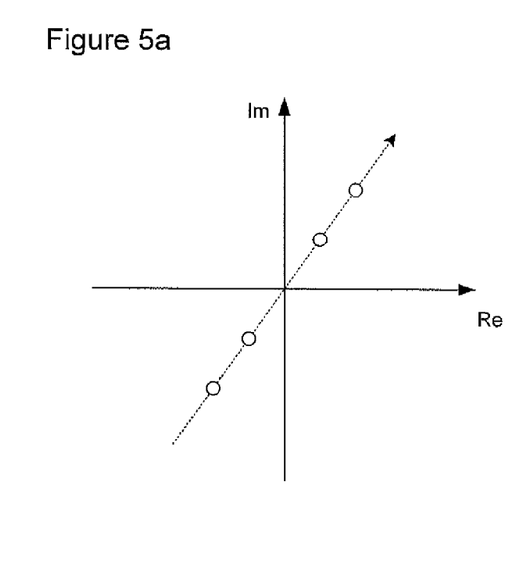
FIGS. 5a and 5b are block diagrams schematically illustrating operations of the DSP of FIG. 3a, in accordance with further representative embodiment of the present invention.
Figure 5B:
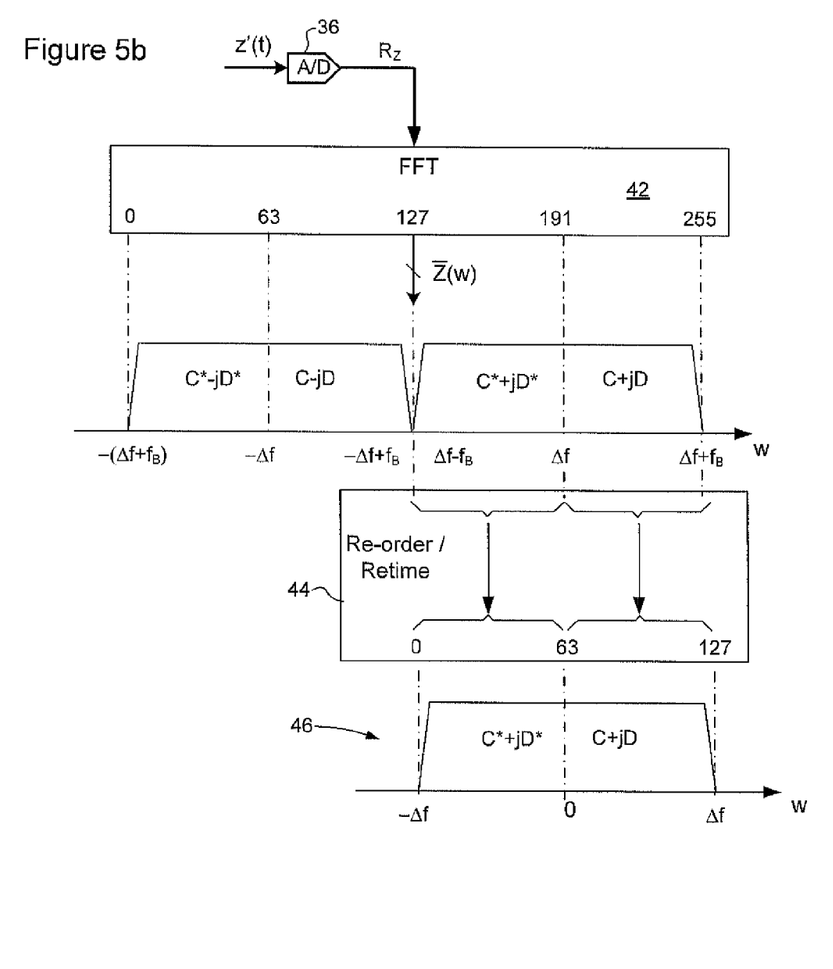

FIGS. 5a-b illustrate operation of an embodiment of the present invention in which the encoding scheme of the data signal x(t) comprises a symbol constellation of four symbols aligned along a common phase vector, as may be seen in FIG. 5a. The FFT vector $\overline{Z}(w)$ output from the FFT 42 closely follows the frequency spectrum of the photodetector signal z(t), as described above with reference to FIGS. 3a-c. In an embodiment in which the FFT 42 has a width of 256 taps, this yields a distribution of tap values as shown in FIG. 5b, in which tap No. 126 corresponds with DC (0 Hz), and taps Nos. 0 and 255 correspond with $-(\Delta f+f_B)$ and $+(\Delta f+f_B)$, respectively. For the special case of the symbol constellation of FIG. 5a, it can be shown that the taps corresponding to the frequency range of $[0, \Delta f+f_B]$ (taps 128-255 in the example of FIG. 5b), contain sufficient information to recover the symbols of the transmitted signal x(t). In this case, a re-ordering and re-timing block 44 can be used to construct a retimed vector having a width of 128 taps; such that taps 0-63 of the retimed vector correspond with taps 128-191 of the FFT vector $\overline{Z}(w)$, and taps 64-127 of the retimed vector correspond with taps 192-255 of the FFT vector $\overline{Z}(w)$. As may be seen in FIG. 5b, this results in a retimed vector 46 that corresponds with the baseband spectrum of the transmitted signal x(t), and ½ of the sample rate of the original FFT vector $\overline{Z}(w)$. An advantage of this arrangement is that subsequent processing, for recovery of the In-Phase and Quadrature components, dispersion compensation and carrier recovery, can be conducted at a lower sample rate than would be required for processing the entire FFT vector $\overline{Z}(w)$.

In the embodiments described above with reference to FIGS. 4 and 5, the re-ordering and re-timing blocks 44 are configured for the case where $f_1=f_0-\Delta f$, as shown in FIG. 3a. Those of ordinary skill in the art will appreciate that these same re-ordering and re-timing blocks 44 can be readily modified for cases in which $f_1=f_0+\Delta f$. Such modifications are considered to lie within the purview of those of ordinary skill in the art, and as such will not be described in detail herein.

The above description details functionality of the signal path for receiving and processing the X-polarization light from the polarization beam splitter 12 of the receiver 10. It will be appreciated that these same techniques may be used to receive and process the received Y-polarization light, by duplicating the power combiner 30, BWF 32, photodetector 34 and A/D converter 36 for the Y-polarization signal path. The raw sample stream of the received Y-polarization may be processed using a DSP that is combined with, or separate from the X-polarization DSP 38, as desired.

In the above description, the invention is described for the special case in which the transmitted polarization, on which the data signal x(t) is modulated, is aligned with the polarization beam splitter 12 of the receiver 10, so that the received X polarization light contains modulation products of the transmitted data signal x(t). As may be appreciated, in the more general case, where the transmitted polarization on which the data signal x(t) is modulated is not aligned with the polarization beam splitter 12, modulation products of the transmitted data signal x(t) will appear in both the received X and Y polarization lights. In this case, the methods of U.S. Pat. No. 7,555,227 can be used to de-convolve the transmitted symbols of the data signal x(t) from both of the received X and Y polarization lights. These same techniques can be used to handle embodiments in which respective different data signals are modulated onto the orthogonal transmitted polarizations.

In the above description, a polarization beam splitter 12 is used to divide the received optical signal into a pair of orthogonal received polarization lights. While these received polarization lights are generally not aligned with the transmitted polarizations of the inbound optical signal, they are aligned with the Rx LO light, which ensures the production of desirable mixing products at the respective X- and Y polarization photodetectors 32. As is known in the art, the strength of the mixing products declines rapidly with misalignment between the received polarization and the Rx LO light. However, in view of the cost of the polarization beam splitter, second mixer and second photodetector(s), it would be desirable to eliminate these components from the receiver. Methods by which this may be accomplished are described below with reference to FIGS. 6a-6b.

Figure 6A:
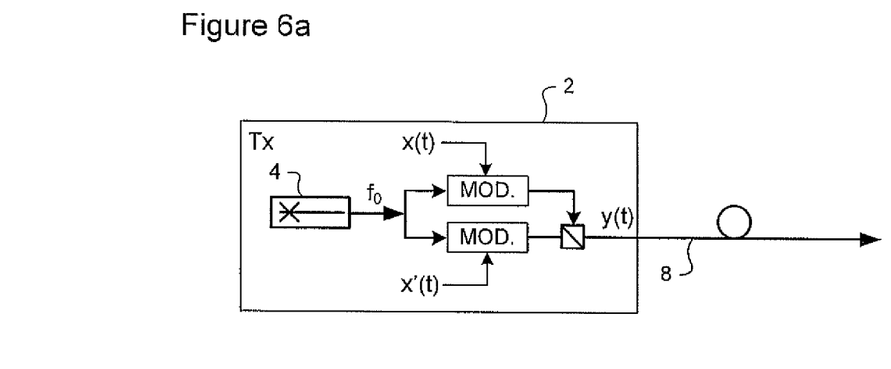
FIGS. 6a-6b are block diagrams schematically illustrating operations of the DSP of FIG. 3a, in accordance with further representative embodiment of the present invention.

As may be seen in FIG. 6a, the transmitter 2 is configured as a dual polarization transmitter capable of transmitting respective signals on orthogonal polarizations. In the embodiment of FIG. 6a, this functionality is used to transmit two different versions of the data signal x(t), on orthogonal polarizations, which are related by a non-linear transformation. This transformation can take any of a variety of different forms, including, but not limited to: a time delay of a duration greater than the maximum tolerated Polarization Mode Dispersion (PMD); a frequency shift (up-conversion) of one version such that the signal spectrum is shifted to a frequency range centered on, for example $2f_B$; and nonlinear coding As may be seen in FIG. 6b, at the receiver, the inbound optical signal is split into two received lights by, for example a 3 db power splitter. One of the received lights is supplied to a coherent detection path and the other received light is supplied to a direct detection path. Within the coherent detection path, the received light is mixed with the linearly polarized Rx LO light, and the combined light made incident on the photodetector 32. Because the inbound optical signal is subject to both PMD and polarization rotations, the transmitted polarizations will tend to sweep through the polarisation angle of the Rx LO light, with the result that the transmitted polarization contributing the mixing products in the photodetector signal z(t) will change over time. However, on average, there will be a received polarization in close enough alignment with the Rx LO light to produce valid mixing products most of the time. Consequently, the methods described above with reference to FIGS. 3 and 4 can be used to recover the In-Phase and Quadrature components of the photodetector signal z(t), which in this case represents the component of the inbound optical signal that is aligned with the Rx LO light polarization.

Figure 6B:
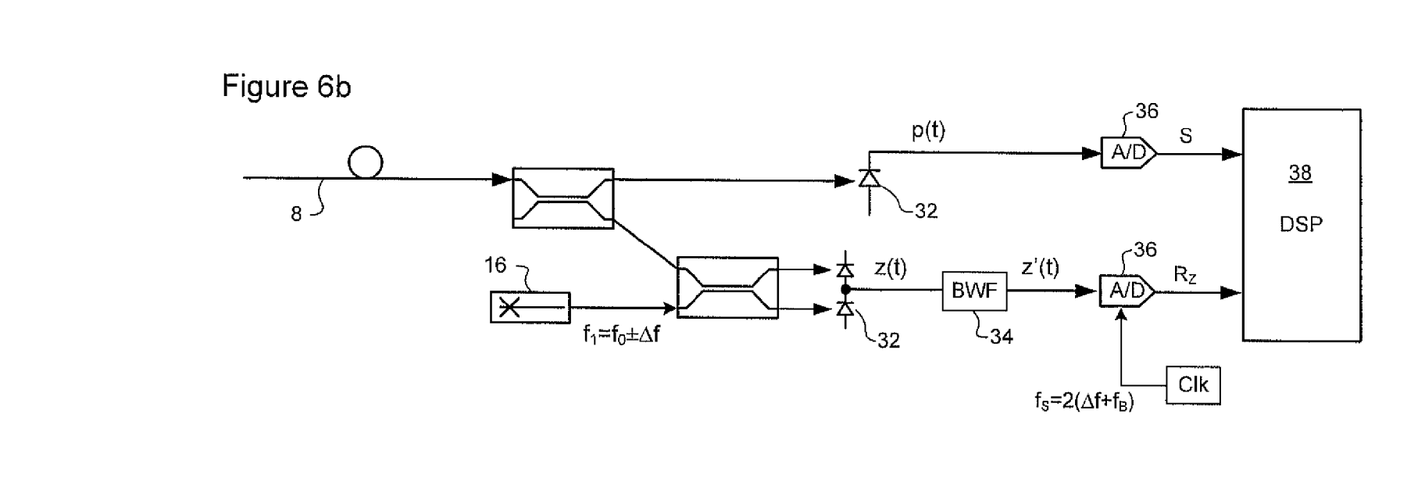

In the direct detection path, the received light is made incident on a photodetector 32, and the photodetector current p(t) sampled by an A/D converter to yield a multi-bit digital sample stream S, which represents the bulk optical power of the received light. This means that the photodetector current p(t), and thus the digital sample stream S, is a non-linear function of both the component of the inbound optical signal that is aligned with the Rx LO light polarization and the component of the inbound optical signal that is orthogonal to the Rx LO light. Since the inbound optical signal component that is aligned with the Rx LO light polarization is known from the coherent detection path, it can be removed from the digital sample stream S by the DSP 38. Various known methods, including, for example Viterbi decoding, can then be used to recover the data signal x(t). The arrangement of FIGS. 6a-b is beneficial in that it enables transmission and recovery of a data signal x(t), in the presence of PMD and polarization rotations, with a minimum of high-cost optical devices at the receiver.

In embodiments in which the non-linear transformation takes the form of a time delay, the photodetector signal z(t) will contain mixing products (from either one of the transmitted polarizations) lying within a frequency range of $[-(\Delta f+f_B), (\Delta f+f_B)]$, as shown in FIG. 3c. Keeping the time delay greater than the PMD precludes the possibility of polarization effects in the optical line transforming the transmitted signal into a single-polarization signal that could then be misaligned with the LO.

The foregoing embodiments have been described with reference to specific frequencies, and frequency ranges. It will be appreciated, however, that other frequencies and frequency ranges may be used without departing from the intended scope of the present invention.

Although the invention has been described with reference to certain specific embodiments, various modifications thereof will be apparent to those skilled in the art without departing from the spirit and scope of the invention as outlined in the claims appended hereto.

We claim:

1. A coherent optical receiver for receiving a data signal x(t) modulated on an optical signal transmitted through an optical communications system, the coherent optical receiver comprising:
    a local oscillator (LO) laser generating a linearly polarized LO light having a frequency of $f_1=f_0\pm\Delta f$, where $f_0$ is a frequency of a narrowband carrier of the optical signal, and $\Delta f$ is at least equal to a band-width $f_B$ of the data signal x(t);
    a single detection path for detecting a respective polarization of received light of the optical signal and for generating a corresponding one multi-bit digital sample stream representative of the detected polarization, the detection path comprising:
        a power combiner for combining the LO light with the respective polarization of received light of the optical signal;
        a single photodetector for detecting a combined light output from the power combiner, and generating a corresponding analog signal;
        a low-pass filter for filtering the analog signal generated by the photodetector to generate a filtered signal, the low-pass filter having a filter characteristic that exhibits a roll-off at a frequency greater than approximately $\Delta f+nf_B$, where n is an integer multiple and $n\geq 1$; and
        an analog-to digital (A/D) detector for sampling the filtered signal at a sample rate greater than approximately $2(\Delta f+nf_B)$ from the low-pass filter to generate a the multi-bit digital sample stream; and
    a digital signal processor for digitally processing the multi-bit digital sample stream to recover respective In-Phase and Quadrature components of the detected polarization.

2. In a coherent optical receiver of an optical communications system, a method of receiving a data signal x(t) modulated on an optical signal, the method comprising:
    generating a linearly polarized LO light having a frequency of $f_1=f_0\pm\Delta f$, where $f_0$ is a frequency of a narrowband carrier of the optical signal, and $\Delta f$ is at least equal to a band-width $f_B$ of the data signal x(t);
    detecting, with a single detection path, a respective polarization of received light of the optical signal and generating a corresponding one multi-bit digital sample stream representative of the detected polarization, the steps of detecting and generating the multi-bit digital sample stream comprising;
        combining the LO light and the respective polarization of received light of the optical signal;
        detecting, by a single photodetector, the combination of the LO light and the respective polarization of the received light of the optical signal;
        low-pass filtering an analog signal generated by the photodetector to generate a filtered signal, using a filter characteristic having a roll-off at a frequency greater than approximately $\Delta f+nf_B$, where n is an integer multiple and $n\geq 1$;
        an analog-to digital (A/D) converter sampling the filtered signal at a sample rate greater than approximately $2(\Delta f+nf_B)$ to generate the multi-bit digital sample stream representative of the detected polarization; and
    digitally processing the multi-bit digital sample stream to recover respective In-Phase and Quadrature components of the received light of the detected polarization.

3. The method as claimed in claim 2, wherein digitally processing the multi-bit sample stream comprises applying respective filter functions to the multi-bit digital sample stream to recover each of the In-Phase and Quadrature components.

4. The method as claimed in claim 3, wherein applying respective filter functions to the multi-bit digital sample stream comprises multiplying the respective filter functions with the multi-bit digital sample stream in the time domain.

5. The method as claimed in claim 2, wherein digitally processing the multi-bit sample stream comprises computing a Fast Fourier Transform of the multi-bit digital sample stream to generate a corresponding FFT vector.

6. The method as claimed in claim 5, further comprising applying respective filter functions to the FFT vector to recover either one or both of the In-Phase and Quadrature components.

7. The method as claimed in claim 5, wherein an encoding scheme of the data signal comprises a symbol constellation of four symbols aligned along a common phase vector, and the method further comprises retiming and re-ordering the FFT vector to generate a retimed vector having ½ the sample rate of the FFT vector.

8. The method as claimed in claim 7, further comprising applying respective filter functions to the retimed vector to recover each of the In-Phase and Quadrature components.

9. The method as claimed in claim 2, wherein first and second versions of the data signal are simultaneously transmitted on substantially orthogonal polarizations.

10. The method as claimed in claim 9, wherein the first version comprises a base-band signal centered at 0Hz and the second version comprises an up-converted signal centered at a frequency of $2f_B$, and wherein the integer multiple n=3.

11. The method as claimed in claim 2, wherein $\Delta f=f_B$.

12. The method as claimed in claim 2, wherein $\Delta f=f_B+\delta f$, where $\delta f$ is a frequency difference selected to prevent overlap between the spectral bands.

13. The method as claimed in claim 12, the frequency difference $\delta f$ is selected based on expected line width and frequency jitter of at least the LO light.

* * * * *